US006385173B1

(12) United States Patent
Lindskog et al.

(10) Patent No.: US 6,385,173 B1
(45) Date of Patent: May 7, 2002

(54) ADAPTIVE CONTROL OF TELECOMMUNICATIONS SYSTEMS WITH MEASUREMENTS OF VARYING TIME-DELAYS

(75) Inventors: Peter Lindskog; Ke Wang Helmersson; Anneli Crona, all of Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/250,639

(22) Filed: Feb. 16, 1999

(51) Int. Cl.[7] .......................... H04Q 7/20; H04B 17/00
(52) U.S. Cl. ................. 370/252; 370/328; 455/423; 455/69; 455/560
(58) Field of Search ................. 370/241, 249, 370/252, 310, 311, 328, 332, 333, 340; 455/422, 423, 67.1, 68, 69, 560, 115

(56) References Cited

U.S. PATENT DOCUMENTS

| 5,129,098 A | * | 7/1992 | McGirr et al. ............... 455/69 |
| 5,524,009 A | * | 6/1996 | Tuutijarvi et al. ........... 370/332 |
| 5,590,418 A | * | 12/1996 | Holoubek et al. ........... 455/126 |
| 5,799,154 A | | 8/1998 | Kuriyan ................. 395/200.53 |
| 6,175,734 B1 | * | 1/2001 | Desgagne et al. .......... 455/437 |

FOREIGN PATENT DOCUMENTS

| EP | 0 836 341 A1 | 4/1998 |
| WO | WO 98/12888 | 3/1998 |
| WO | WO 98/58501 | 12/1998 |

OTHER PUBLICATIONS

Standard Search Report for RS 102692 US Completed on Aug. 18, 1999, Aug. 20, 1999, EPO.
U.S. application No. 09/097,413, Newcombe et al., filed Jun. 16, 1998.
Network Time Protocol (Version 3) Specification, Implementation and Analysis; David L. Mills, University of Delaware, Mar. 1992; Network Working Group; Request for Comments (RFC) 1305; pp. 1–106.

* cited by examiner

Primary Examiner—Ricky Ngo
(74) Attorney, Agent, or Firm—Jenkens & Gilchrist, P.C.

(57) ABSTRACT

A method and system that enables the changing of the gain in a closed loop (e.g., self-configuring) telecommunications system based on the age of the available measurements. A high gain is used when measured data are "fresh", so as to obtain a good performance (e.g., a fast response) for the telecommunications system. The gain is then reduced when the age of the measurements increases. The decreased gain results in a slower system response, but this is a desirable result in order to preserve stability. The system and method may be applied, for example, in many mobile telecommunications systems (e.g., GSM, WCDMA, etc.). In one embodiment, the system and method of the present invention modify the closed loop gain in an adaptive fashion and use one or more fuzzy membership functions for specifying what is meant by "fresh" measurements.

33 Claims, 5 Drawing Sheets

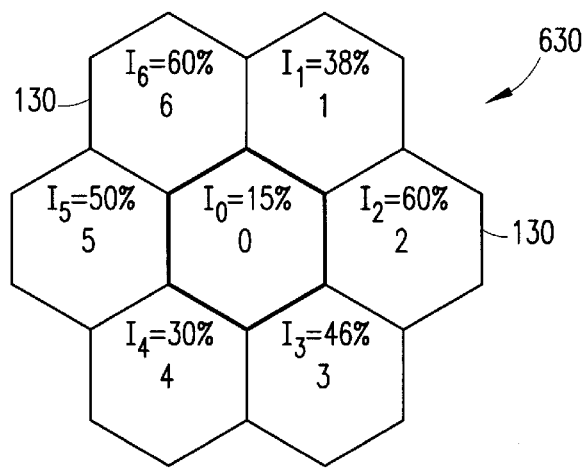
FIG. 6A
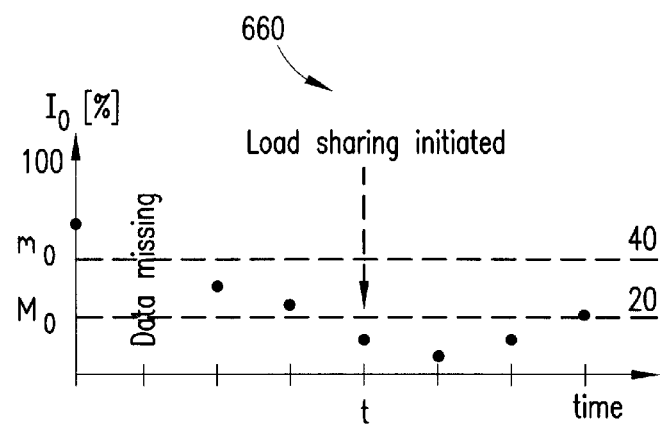
FIG. 6B
| t-3Ts | t-2Ts | t-Ts | t | |
|---|---|---|---|---|
| --- | 30% | 25% | 15% | cell 0 |
| 29% | 39% | 46% | 38% | cell 1 |
| 60% | --- | --- | --- | cell 2 |
| 48% | 50% | 46% | --- | cell 3 |
| 35% | 30% | --- | --- | cell 4 |
| 55% | 50% | --- | 50% | cell 5 |
| 55% | 49% | 52% | 60% | cell 6 |
FIG. 6C

ADAPTIVE CONTROL OF TELECOMMUNICATIONS SYSTEMS WITH MEASUREMENTS OF VARYING TIME-DELAYS

BACKGROUND OF THE INVENTION

1. Technical Field of the Invention

The present invention relates in general to the field of control systems, and in particular, by way of example but not limitation, to adaptive control for telecommunications systems that have measurements of varying time-delays.

2. Description of Related Art

Mobile wireless communication provides many benefits to subscribers of wireless communications services, such as safety, convenience, improved productivity, and simple conversational pleasure. One prominent mobile wireless communication option is cellular communication. Cellular phones, for instance, can be found in cars, briefcases, purses, and even pockets. Cellular phone use is proliferating both because it provides these benefits and because the expense of using cellular phones continues to decrease. One manner to continue decreasing the cost of cellular phone use is to improve the control of cellular systems (e.g., increase the efficiency of infrastructure utilization).

A typical cellular system is composed of a number of mobile stations (MSs), each of which is connected to one or more base stations (BSs) via a radio interface (e.g., which is normally based on a pre-established standard). Usually, one BS handles the traffic in a given area, such as a cell. The BSs are further connected to a radio network controller (RNC), which in turn communicates with a mobile switching centre (MSC). MSCs are also connected to a fixed network (e.g., a public switched telephone network (PSTN), an integrated services digital network (ISDN), the Internet, etc.) in some manner. Additionally, at least one home location register (HLR) is typically present and accessible from the MSCs. Each individual BS, RNC, MSC, and HLR object may in general be considered a network element (NE). The collection of NEs together form the "network".

An important task of the NEs is to collect measurements and compute various system quantities, such as the bit error rate (BER), the signal to interference ratio (S/I), the number of successful access attempts (NSAA), the NE traffic load (NETL), etc. These "low-level" quantities are passed to a radio network operation (RNO) system for further analysis, depending on which system modifications may be commanded (e.g., ordered, instructed, etc.), either manually or automatically. The automatic mode of operation is becoming increasingly important because (i) the complexity of systems is rapidly increasing, thereby making it difficult to handle all operations fully manually, and (ii) an automatic solution has the ability to react to changes much faster than a manual one, which can result in an increase in the revenue of the operator of the system.

However, for an automatic control solution to be feasible, it is crucial in conventional systems that the measurements are delivered in "real-time". It should be noted that the intended meaning of "real-time" may vary depending on the intended application of the measurements. For example, at times the measurements should be delivered on a millisecond basis, and at other times it may be sufficient to acquire measurements every day or so. For an RNO system that focuses on control of a region or network, the typical granularity desired is on the order of seconds or sometimes minutes.

Today's RNO systems include very few, if any, automatic control functions. The ones that are realized focus on control on a NE level, where it may be assumed that new and fresh measurements are regularly available. The special problems encountered when performing automatic region and/or network level control in a cellular system have not been studied in significant detail, much less solved. In fact, the control community has heretofore failed to address with any substantial attention the problems within this domain.

Assume, by way of example, that an operator has defined a geographical area (e.g., governed by a number of NEs) in which a concept, such as the overall traffic load (OTL) in the area, has been defined. The computation of this overall traffic load is then based on measurements, such as the individual NETLs, delivered to the RNO system from a number of NEs. Assume also, by way of example, that the operator has specified a desired maximum allowed traffic load (MATL) (e.g., a reference signal). Based on the computed overall traffic load and the desired maximum allowed traffic load, a controller would order changes in/to the NEs so that the actual (and computed) traffic load remains beneath the desired maximum value, even though the requested traffic varies.

The problem with such an automatic control solution is that the computed traffic load is based on measurements of different ages (unless the entire system is synchronized, which is highly unlikely in conventional systems). Consequently, if the control system is fed with "too old" measurements, the system becomes unstable, which should be avoided at any cost. A common conventional technique of handling this problem is to design the controller(s) for the worst possible age of the measurements (which, in practice, is something that is very hard to determine in any event). In terms of controller design, the consequence is that the closed-loop gain must be reduced, which leads to a slower system response. Unfortunately, this slower system response occurs even when all the measurements are "fresh". Using this conventional approach, stability is achieved but at the expense of performance, regardless of the age of the measurements. In summary, conventional control systems have heretofore only achieved stability in systems with measurements of differing age by slowing system response in accordance with the estimated oldest age of all of the applicable measurements.

SUMMARY OF THE INVENTION

The deficiencies of the prior art are overcome by the method and system of the present invention. For example, as heretofore unrecognized, it would be beneficial if a telecommunications control application was designed to be adaptive in its response to measurements of varying age. In fact, it would be beneficial if an adaptive component slowed control system response when measurements on which the control system response were determined were "older". Consequently, such an adaptive component ameliorates the trade-off between system performance and system stability under operational conditions that include measurements of varying time-delays.

The method and system of the present invention enables the changing of the gain in a closed loop (e.g., self-configuring) telecommunications system based on the age of the available measurements. A high gain is used when measured data are "fresh", so as to obtain a good performance (e.g., a fast response) for the telecommunications system. The gain is then reduced as the age of the measurements increases. The decreased gain results in a slower system response, but this is a desirable result in order to preserve stability. The system and method may be applied, for example, in many mobile telecommunications systems (e.g., a Global System for Mobile Communications (GSM) system, a Wideband Code Division Multiple Access (WCDMA) system, etc.) that include a number of distributed network elements. In one embodiment, the system and method of the present invention modify the closed loop gain in an adaptive fashion and use one or more fuzzy membership functions for specifying what is meant by "fresh" measurements.

An important technical advantage of the present invention is that it enables a control system of a telecommunications system to operate with measurements of varying age.

Another important technical advantage of the present invention is that it provides an ability to de-emphasize "older" measurements in favor of "newer" measurements.

Yet another important technical advantage of the present invention is the ability to improve control system response time in a telecommunications system by applying a high gain when measurements are "fresh" to achieve a fast response time and a lower gain when some or all measurements are "too old" to ensure system stability.

Yet another important technical advantage of the present invention is that it may be utilized in a wireless communications system for implementing automatic control of network-level adjustments.

Yet still another important technical advantage of the present invention is that it may be advantageously applied to and/or implemented in conjunction with an Internet Protocol network (IP-net), etc.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein:

FIGS. 6A–6C illustrate an exemplary telecommunications application of the principles of the present invention.

DETAILED DESCRIPTION OF THE DRAWINGS

A preferred embodiment of the present invention and its advantages are best understood by referring to FIGS. 1–7 of the drawings, like numerals being used for like and corresponding parts of the various drawings.

Aspects of the GSM standard are used to describe a preferred embodiment of the present invention. However, it should be understood that the principles of the present invention are applicable in general to electronic systems that include a control sub-system as well as other wireless communication standards (or systems), especially those wireless communication standards (or systems) that permit measured data to be collected and that enable parameters of the associated wireless network system to be adjusted in response thereto.

Figure 1:
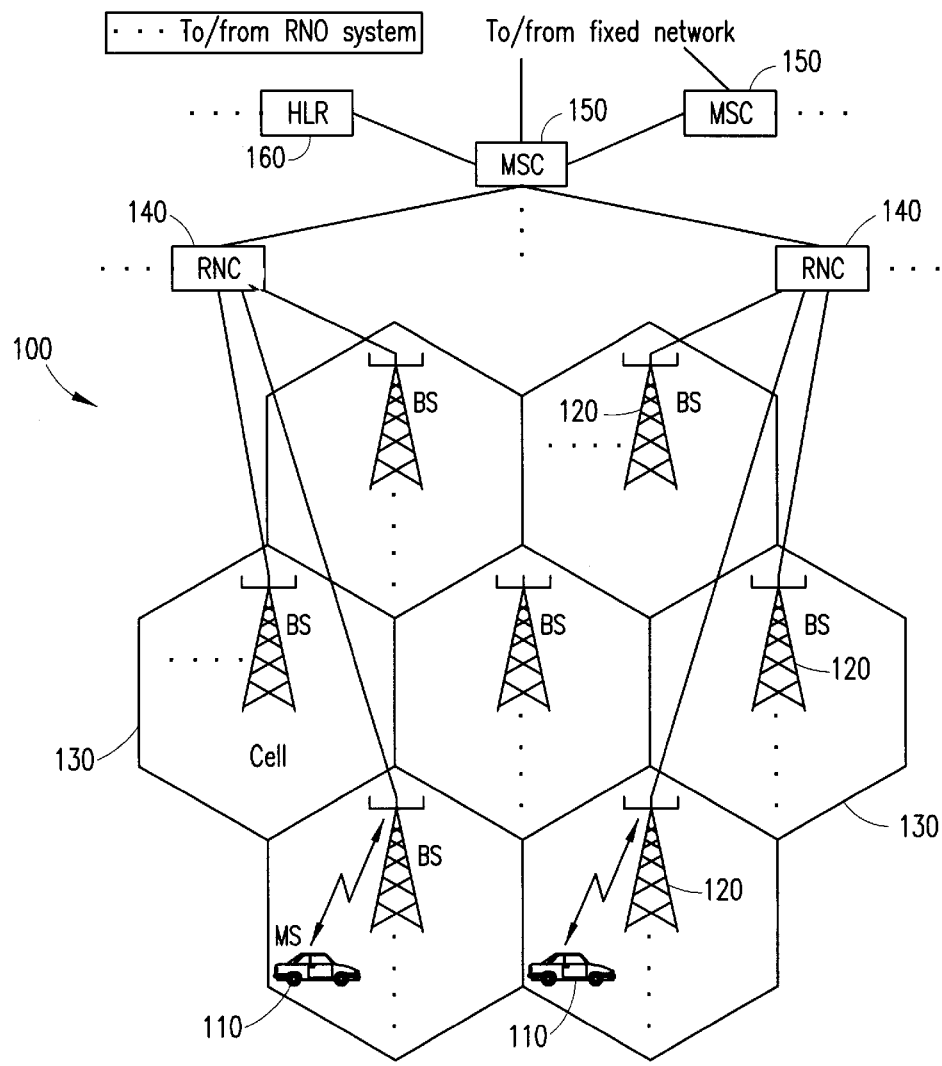
FIG. 1 illustrates an exemplary general wireless network communications system in which the present invention may be advantageously applied.

Referring now to FIG. 1, an exemplary general wireless network communications system in which the present invention may be advantageously applied is illustrated generally at 100. The wireless network 100 is composed of, in this exemplary diagram, a number of MSs 110, each of which is connected to one or more BSs 120 via a radio interface (which may adhere to any of many established standards). Each of the BSs 120 may handle the traffic in an area (e.g., a cell 130). The BSs 120 are further connected to one or more RNCs 140, which in turn communicate with one or more MSCs 150. The MSCs 150 are also connected to the fixed network (e.g., a PSTN, ISDN, Internet, etc.) in some way. Also, at least one HLR 160 is present for storing subscriber information and is accessible from the MSCs 150. As noted above, each individual BS 120, RNC 140, MSC 150, and HLR 160 object may be considered generically as an NE. Together, the NEs form the "network".

As noted above, an important task of the NEs is to collect measurements and compute various system quantities, such as the BER, the S/I, the NSAA, NETL, etc. These "lowlevel" quantities are passed to the RNO system (not explicitly shown in FIG. 1, but see element number 210 of FIG. 2, which is described below) for further analysis. After the analysis, the RNO system may automatically command one or more NEs to be adjusted, thereby adjusting the performance of the overall wireless network. In the wireless network 100, connections to the RNO system from various NEs are indicated by a dashed line. In accordance with certain embodiments of the present invention, relevant measurements from the NEs are time-stamped (e.g., <x, t>, where x is the measured value and t is the time when it is generated). For these time-stamps to be meaningful, it is preferable that all NEs and the RNO system have the same apprehension of time, which can be achieved, e.g., by using a time synchronization protocol, such as the network time protocol (NTP). NTP, as well as other time synchronization protocols, is well known to those of ordinary skill in the art. It is also preferable that the RNO system architecture supports real-time operations. An example of such a real-time telecommunications performance management system platform is described in U.S. patent application Ser. No. 09/097,413, filed Jun. 16, 1998, to Adrian Newcombe and Jila Seraj, entitled "A telecommunications performance management system", which is hereby incorporated by reference in its entirety herein.

Figure 2:
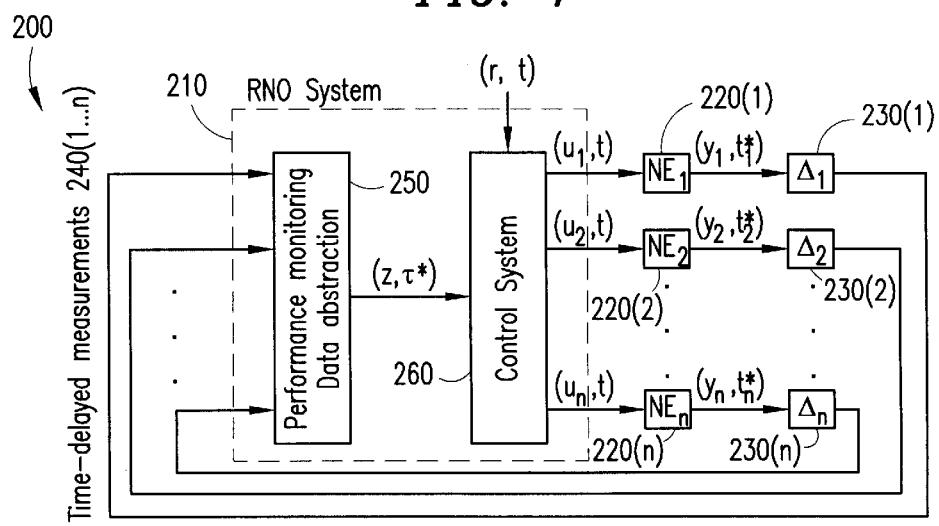
FIG. 2 illustrates an exemplary logical block diagram of a wireless network system in conjunction with an RNO system in accordance with the present invention.

Referring now to FIG. 2, an exemplary logical block diagram of a wireless network system in conjunction with an RNO system 210 in accordance with the present invention is illustrated generally at 200. The RNO system 210 outputs values (i.e., control commands) (e.g., <($u_i$, t>) to the NEs 220(1) ... 220(n) (e.g., $NE_1$ 220(1), $NE_2$ 220(2), ... $NE_n$ 220(n)). The NEs 220(1) ... 220(n) output values (e.g., <($y_i$, $t_i$*>) that may be affected by Δs 230(1) ... 230(n) (e.g., $Δ_1$ 230(1), $Δ_2$ 230(2), ... $Δ_n$ 230(n)), where the Δs represent possible time delays before the output values $y_i$ can be used by the RNO system 210. These Δs may be caused by, for example, link and/or processing delays. After these delay(s), as represented by the Δs 230(1) ... 230(n), time delayed measurements 240(1 ... n) are input to the RNO system 210. A performance monitoring system (PMS) 250 implements a data abstraction from the time delayed measurements 240 (1 ... n) and produces a value (e.g., <z, τ*>). This value is input to control system (e.g., one or more controllers) 260 along with a reference signal (e.g., <r, t>). The control system 260, in accordance with the principles of the present invention, supplies the output values (e.g., ($u_i$, t>) to the NEs 220(1) ... 220(n).

In this exemplary embodiment, it is assumed (by way of example but not limitation) that the operator of the wireless network system has defined a geographical area (e.g., governed by a number of the NEs 220(1) ... 220(n>) in which a concept, such as the OTL in the area, has been defined. The computation of this OTL is based on measurements, such as individual NETLs, delivered to the RNO system from a number of the NEs 220(1) ... 220(n). It is also assumed (by way of example but not limitation) that the operator has specified a desired MATL (e.g., a reference signal "r"). Based on these two values (e.g., the OTL and the MATL), the control system 260 orders changes in the NEs 220(1) ... 220(n) so that the actual (and derived) traffic load is maintained so as to be below the maximum value, even when the requested traffic varies.

According to one embodiment of the present invention, the closed-loop gain is adaptively changed based, at least partly, on the age of the measurements. As a result, the performance is reduced (e.g., by lowering the gain) only in those (relatively) rare situations when the measurements become "too old". Otherwise, the gain is advantageously set relatively high (e.g., as compared to controllers tuned for the worst case age of measurements) so as to improve the performance without endangering stability. The NEs 220(1) ... 220(n) send time-stamped measurements (e.g., $y_i$) to the PMS 250, which may be of the distributed kind, which are described in, for example, U.S. patent application Ser. No. 09/097,413, as incorporated by reference hereinabove. The PMS 250 is responsible for computing the high-level quantity (e.g., "z") that is required by the control system 260. The high-level quantity z is then compared to the corresponding target value r. Based thereon, suitable control actions (e.g., "$u_i$") are computed and ordered to be effectuated.

It should be noted that the system 200 includes simplifications intended to avoid obscuring the principles of the present invention with unnecessary detail. For example, each $NE_i$ receives one single control action $u_i$ and delivers one kind of performance measurement $y_i$. However, the present invention is not so limited. In general, each $NE_i$ may pass any number of measurements $y_i$, and there may be more than one control actions $u_i$ sent to each $NE_i$. Furthermore, the RNO system 210 may also involve multiple different high-level quantities $z_i$ as well as additional reference signals $r_i$.

The control system 260 operates on asynchronous (e.g., aperiodic) or synchronous (e.g., periodic) data, but it computes and delivers control signals at most every $T_s$ time unit. This computation is based on the most recent data available from the PMS 250. Whenever a new z value is delivered by the PMS 250, the new z value is accompanied with a time-stamp (e.g., "τ"), which is preferably computed as:

$$\tau^* = \min(t_1^*, t_2^*, \ldots, t_n), \quad (1)$$

where $t_1^*, t_2^*, \ldots t_n^*$ are the times at which the most recent NE measurements $y_1, y_2, \ldots, y_n$, respectively, were generated. In the PMS 250, it may be specified that only a part of those measurements are needed to compute z (e.g., z can be based on the 75% most recent values of the current $y_1, y_2, \ldots, y_n$). In such cases, only the time-stamps corresponding to the 75% most recent values of $y_i$ may be used when computing τ*.

Figure 3:
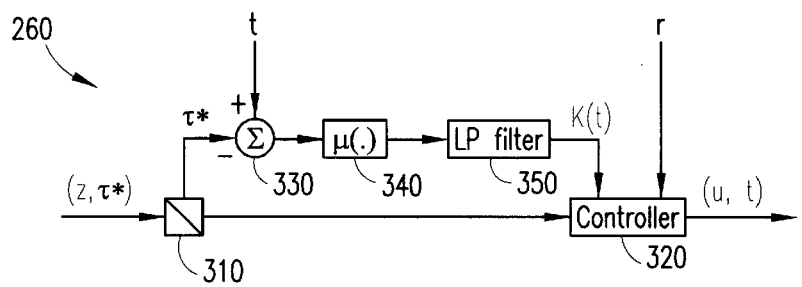
FIG. 3 illustrates an exemplary, more-detailed logical block diagram of part of a control system of FIG. 2 in accordance with the present invention.

Referring now to FIG. 3, an exemplary, more-detailed logical block diagram of part of the control system 260 of FIG. 2 in accordance with the present invention is illustrated. These components are illustrated schematically in block form. It should be understood that they may be implemented as one or more software modules, as firmware, as hardware units, or any combination thereof. For example, one or more subroutines may be designed to implement the present invention on one or more digital signal processors (DSPs) as part of the RNO system 210.

The control system 260 receives <z, τ*> at a "splitter" 310. The splitter 310 forwards the "high-level" value z to a controller 320 and the value τ* to a summer 330. The summer 330 subtracts the value τ* from the value t. The result is received at a μ(·) function block 340. The output of the μ(·) function block 340 is passed to a low pass (LP) filter block 350. After filtering, the value K(t) is forwarded to the controller 320. The controller 320 also receives as input the reference signal r. The controller 320 operates on the three input variables (e.g., z, K(t), and r) and produces the output <u, t>.

The control system 260 of FIG. 3 includes one embodiment for an adaptation mechanism for handling varying time-delayed measurements. The method and system is applicable to a large family of controllers, where a gain K* is used to specify the amplitude of the control signal u (e.g., a controller where u=K* f( ... ) with f( ... ) being a function of any known values of z and r. One example in this category is the Proportional Integral (PI)-controller (another more general example is the Proportional Integral Derivative (PID)-controller). The PI-controller may be (in one straightforward realization) mathematically expressed as:

$$e(t) = r(t) - z(\tau) \quad (2)$$

$$S(t) = S(t - T_S) + \frac{T_S}{T_I} e(t), S(0) = 0, \text{ and} \quad (3)$$

$$u(t) = K^* (e(t) + S(t)), \quad (4)$$

where $T_I$ and K* are parameters that are tuned by the control designer, as is known to those of ordinary skill in the art.

Assuming (by way of example but not limitation) that this tuning is always performed for the case when the measurements are up-to-date (as is typical), the method and system of the present invention introduces an additional scale factor that reduces the overall gain in cases when the age of the measurements increases. This can be expressed mathematically as:

$$u(t) = K(t) K^* f( \ldots ), \quad (5)$$

where K(t) may be designed to take values between "0" and "1". A "1" (or a value close to "1") is returned for "fresh" measurements, but the older the measurements become, the more cautious the controller becomes (e.g., K(t) may be designed to approach "0" when the age of the measurements increases) There are multiple techniques for achieving this behavior for K(t)

Figures 4A, 4B, 4C:
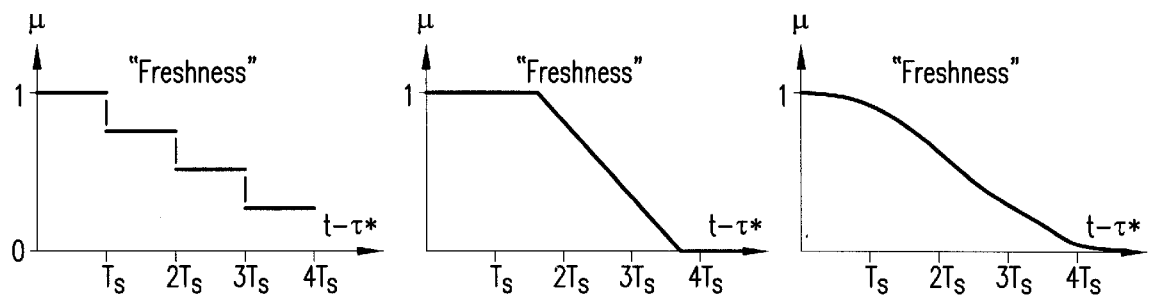
FIGS. 4A–4C illustrate exemplary fuzzy membership functions for specifying the degree of "freshness" of measurements in accordance with the present invention.

Referring now to FIGS. 4A–4C, exemplary fuzzy membership functions for specifying the degree of "freshness" of measurements in accordance with the present invention are illustrated. These exemplary fuzzy membership functions may be used to assign values between "0" and "1"to K(t) by tuning a function $\mu(t-\tau^*) \in [0, 1]$, which in a fuzzy context is termed a membership function and is used in one embodiment of the present invention to quantify the degree of "freshness" of the measurements. Using such a fuzzy membership function $\mu(t-\tau^*)$ in this manner corresponds to the summer 330 providing input to the $\mu(\cdot)$ function block 340 (of FIG. 3). FIGS. 4A, 4B, and 4C show three different exemplary possibilities for choosing this membership function. Each of the FIGS. 4A, 4B, and 4C graphs $(t-\tau^*)$ (e.g., from 0 to $4T_s$) versus $\mu$ (from 0 to 1). FIGS. 4A, 4B, and 4C are essentially a decreasing step function, a negative ramping function, and an inverse exponential function, respectively. The particular shape of $\mu(\cdot)$ depends on the application, and is therefore a choice of the control designer, especially after adequate experimentation. However, experimental evidence indicates that a ramping function is usually (but not necessarily always) sufficient.

The above-described embodiment (e.g., fuzzy membership function $\mu(t-\tau^*)$ alone) of the present invention may be further improved by using an LP filter because in the above-described embodiment, the overall gain may change significantly from one control command computation to another, which can lead to an undesirable oscillating pattern in the behavior of the affected system. To avoid this oscillation (e.g., in another embodiment that includes the LP filter block 350), the rate of change of the gain may be restricted using an LP filter, preferably a simple one, such as:

$$K(t)=\alpha K(t-1)+(1-\alpha)\mu(t-\tau^*), K(0)=1, \qquad (6)$$

where $\alpha$, $0 \leq \alpha < 1$, is a forgetting factor determining the rate with which the gain is allowed to change. A large $\alpha$-value causes a slow adaptation, while a small $\alpha$-value results in a fast adaptation. Experiments suggest that a value over approximately 0.6 is reasonable, but this may vary from application to application. It should be noted that this filter always produces a value in the desired range. Moreover, instead of using a single gain-filter for all the different controllers, it may be preferable to individually design one such filter for each different controller.

It should be understood that the gain-filters need not be located in the control unit(s). They may alternatively be included as a part of the $NE_i$s (e.g., if only $\tau^*$ is fed back with the control signal). This alternative is especially useful when additional time is required for a submitted control signal to reach and be handled by an $NE_i$, in which case those time-delays are also accounted for. It should also be understood that the above described linear gain-filter operates in a symmetric fashion inasmuch as the gain is increased or decreased equally quickly. In another alternative embodiment, it may be desirable to decrease the gain more quickly than it is increased in order to achieve a more cautious behavior when switching back to normal operations. For this embodiment, a nonlinear (and thus more complex) gain-filter is preferably employed.

Referring jointly now to FIGS. 5A–5D, exemplary improvements of closed-loop control results in accordance with the present invention are illustrated by comparing closed-loop results from controllers without an adaptive mechanism to those with an adaptive mechanism. The benefits of the present invention are thereby illuminated in this (simplified) example. In this example, it is assumed (by way of example but not of limitation) that a first-order dynamic system with one input and one output signal is to be controlled. It is also assumed (also by way of example but not of limitation) that the control objective is to follow a reference signal r(t) that is varying in a stepwise fashion between zero and one. The normal situation is that an output measurement y(t) is available to the controller $T_s$ time units after it has been generated.

However, using a reference signal r(t) composed of 400 samples, it is now assumed (by way of example but not of limitation) that the delay (e.g., due to a link problem, etc.) increases to $3T_s$ from sample 80 to sample 250, after which the delay returns to its default value. Applying a simple PI-controller (here, of the form detailed above) leads to the closed-loop control results of FIGS. 5A–5D. It should be noted that the abscissa axis (e.g., the x-axis) is marked from 0 to 400 samples in each figure. The ordinate axis (e.g., the y-axis), on the other hand, ranges from −50 to +50, from −0.5 to +1.5, from −0.5 to +1.5, and from 0 to +1 for FIGS. 5A, 5B, 5C, and 5D, respectively.

Figure 5A:
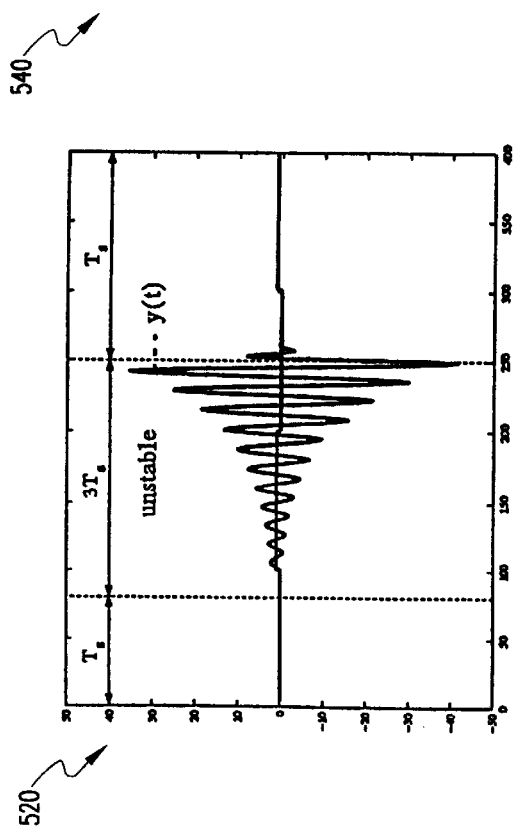
FIG. 5A illustrates an unstable closed-loop control result without an adaptive mechanism when a controller is tuned for a nominal delay.
Figure 5B:
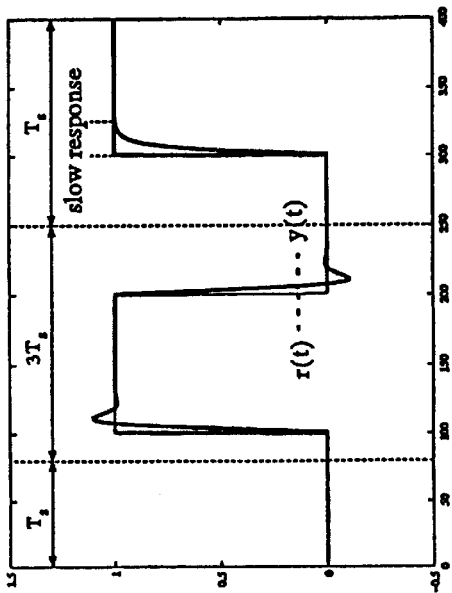
FIG. 5B illustrates a closed-loop control result without an adaptive mechanism when a controller as in FIG. 5A is tuned for a maximum delay.

Referring individually now to FIG. 5A, an unstable closed-loop control result without an adaptive mechanism when a controller is tuned for a nominal delay is illustrated generally at plot 520. Specifically, the controller is tuned for the nominal delay $T_s$. Referring individually now to FIG. 5B, a closed-loop control result without an adaptive mechanism when a controller as in FIG. 5A is tuned for a maximum delay is illustrated generally at plot 540. Specifically, the controller is tuned for the maximum delay of $3T_s$ in this example.

Figure 5C:
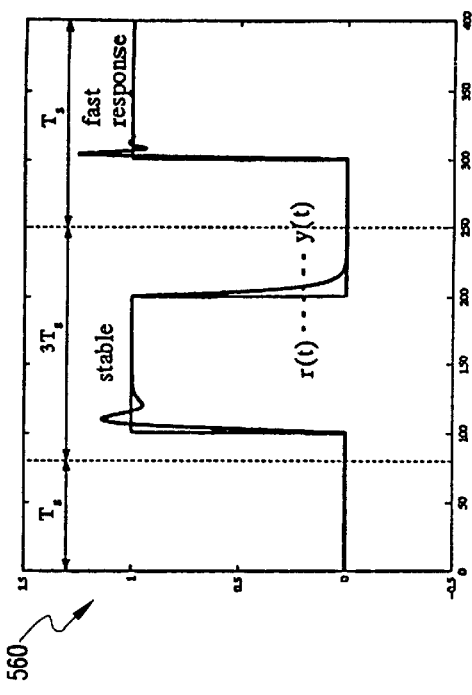
FIG. 5C illustrates exemplary improvements in closed-loop control results in accordance with the present invention.
Figure 5D:
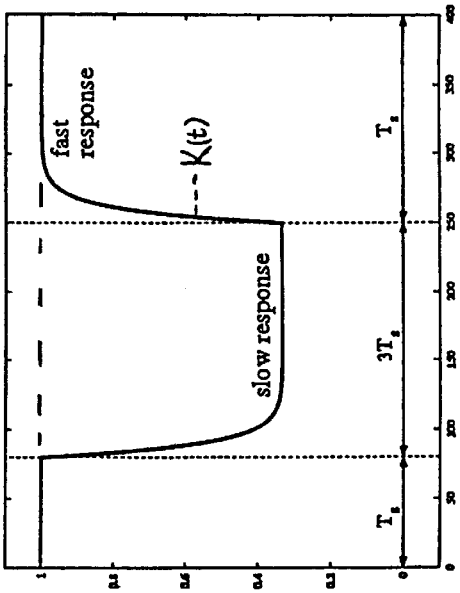
FIG. 5D illustrates exemplary adjustments to the gain as a function of the delay when the controller of FIG. 5C is implemented, in accordance with the present invention.

Referring individually now to FIG. 5C, exemplary improvements in closed-loop control results in accordance with the present invention are illustrated generally at plot 560. The controller is equipped with an adaptive mechanism with $\mu p(\cdot)$ having a shape similar to that of FIG. 4B and an $\alpha$ of 0.9. Referring individually now to FIG. 5D, exemplary adjustments to the gain as a function of the delay when the controller of FIG. 5C is implemented, in accordance with the present invention, are illustrated generally at plot 580. In other words, the graph in FIG. 5D indicates how the filter gain K(t) is changed as a function of the delay when the controller of FIG. 5C is used.

These plots reveal several observable phenomena. First, although the closed-loop response in the plot 520 is quite fast for the nominal delay, the problem is that the overall system becomes unstable in the middle section where the delay is $3T_s$. This is an unacceptable behavior, which should be avoided in actual physical systems. Second, the more cautious controller in the plot 540 produces a stable response, but that response is rather slow. This is observable by comparing the rise time for the step response starting at sample 300 of the plot 540 with that obtained using the principles of the present invention as shown in the plot 560. The plots 560 and 580 reveal that an adaptation mechanism in accordance with the present invention addresses the trade-off between response time and the availability of "fresh" data. In the middle section, the controller becomes rather cautious (e.g., comparable to the control results in the plot 540), whereas in other regions a fast step response is obtained.

Referring now to FIGS. 6A–6C, an exemplary telecommunications application of the principles of the present invention is illustrated. More specifically, this exemplary telecommunications application is directed to one exemplary embodiment of a cellular communications system in which the method and system of the present invention may be advantageously applied. Although this example is directed toward a system operating in accordance with the GSM standard, it should be understood that the system and method of the present invention may be applied to other wireless network systems, both existing ones as well as future ones.

In a GSM system, the cell load sharing feature may be activated from a base station controller (BSC) (e.g., corresponding to an RNC 140 of FIG. 1). It should be noted that the cell load sharing concept is well known to those of ordinary skill in the art. The purpose of this cell load sharing function is to distribute some of the traffic load in one cell to its surrounding cells during traffic peaks in the one cell. In physically realized systems, this cell load sharing is achieved by moving established connections in the one cell to neighbouring cells that have idle traffic channels.

The cell load sharing mechanism may be based on periodic load computations, providing the amount of idle full rate traffic channels in each cell. When the traffic load monitoring fails to work periodically as it is intended to do (e.g., because measuring delays, processing delays, transmission delays, malfunctions, etc. interfere) (or the BSC is redesigned to compute the load in an aperiodic manner), the cell load sharing principles may be complemented with the time-delayed compensation principles of the present invention to enable more reliable load sharing decisions.

Continuing now with FIG. 6A, an exemplary portion of a wireless network is illustrated generally at 630. Each of the seven (7) cells 130 (e.g., cell 0 through cell 6) has an associated percentage of idle traffic channels $I_i$ (e.g., $I_0$ through $I_6$). In cell 0, few idle channels are available. Continuing now with FIG. 6B, an exemplary plot 660 graphs time versus $I_0$ (e.g., load monitoring of cell 0). The principles of cell load sharing are briefly recapitulated: First, the load sharing scheme is initiated for cell i when the percentage of idle traffic channels, $I_i$, falls below a predefined limit $M_i$ (i.e., when $I_i \leq M_i$). In the example illustrated in the exemplary wireless network portion 630 and the plot 660, cell load sharing is initiated at time t for cell 0 when $I_0 \leq M_0$ (=20%). Second, the next step is to determine the set of neighbouring cells suited for overtaking (e.g., accepting via handover) part of the traffic from cell i. An exemplary criterion for allowing cell load sharing handover to a neighbouring cell j is that cell j's current percentage of idle traffic channels $I_j$ exceeds a limit, $m_j$ (i.e., $I_j > m_j$). If all $m_j$ of the neighbours of cell 0 in the exemplary wireless network portion 630 are set to 40%, then cells 2, 3, 5, and 6 are considered for accepting incoming cell load sharing handover from cell 0.

Continuing now with FIG. 6C, an exemplary load sharing scenario table 690 is illustrated. Each cell i has an entry $I_i$ (although the entry may be blank if, for example, arrival of the load data is delayed or prevented) for each time frame (e.g., from t to t−3$T_s$). The load sharing scenario table 690 exemplifies how some data cannot always be delivered periodically. The cell load sharing algorithm is based on the availability of "fresh" data from all cells i. In cases in which this cannot be guaranteed (as is exemplified by the load sharing scenario table 690), the algorithm may try to forward traffic to a cell that is actually much heavier loaded than what the available (e.g., old and "stale") data indicates.

To alleviate this problem and implement a control system that operates more cautiously, the principles of the present invention may be advantageously applied to introduce an adaptive limit for when a cell load sharing handover is permitted. More specifically, instead of using the fixed criterion $I_j > m_j$ for determining the set of cells available for load sharing, the time when each $I_j$ was determined (e.g., computed) is taken into account by the decision rule:

$$I_j > m_j + (100 - m_j)(1 - \mu_j(\cdot)) = 100 + (m_j - 100)\mu_j(\cdot). \quad (7)$$

The algorithm represented by equation 7 is an alternative to the algorithm exemplified by the control system 260 (of FIG. 3). The function block 340, instead of computing $\mu(\cdot)$, computes $1-\mu(\cdot)$. Also, no LP filter is used, and the controller follows a simple decision rule. The variable $I_j$ corresponds to the variable z (of FIG. 3), and the variable $m_j$ corresponds to the variable r. Designing $\mu j(\cdot)$ in accordance with the principles of the present invention as described above results in the following qualitative behaviour. As the age of $I_j$ increases, the corresponding membership function will tend to zero, and hence the limit for allowing load sharing handover to cell j tends to 100% (e.g., which here means that with reasonable values of $m_j$ (<100%), cell j is excluded from the set considered for overtaking part of the traffic). With "fresh" data, on the other hand, the membership function will return one, and hence the original load sharing handover criterion is achieved. Using a single shape, for all membership functions (which is reasonable in this embodiment) in the example that corresponds to the load sharing scenario table 690, leads to the result that the first candidate cell to be removed (due to the old age of this measurement) from the set available for cell load sharing handover is cell 2, then cell 3, and so forth. In practice, of course, rank order does not matter with respect to this example inasmuch as a cell is either removed or not from the set available for cell load sharing handover.

It should, however, be understood that the determination as to which (how many) cell(s) are to be removed from this set depends on the shape of the membership function. For example, assume that cell 2 is associated with a membership function $\mu_2(\cdot)$, which for t−3$T_s$ returns a 0.75 belief value that the most recent measurement from cell 2 is sufficiently "fresh". Inserting this 0.75 belief value into equation 7 results in 60>100+(40−100)·0.75, or 60>55. Consequently, cell 2 remains a candidate handover target cell. However, with a different membership function choice that returns, say, a 0.5 belief value, the inequality would no longer be true, and cell 2 would be removed from the handover target cell set.

Figure 7:
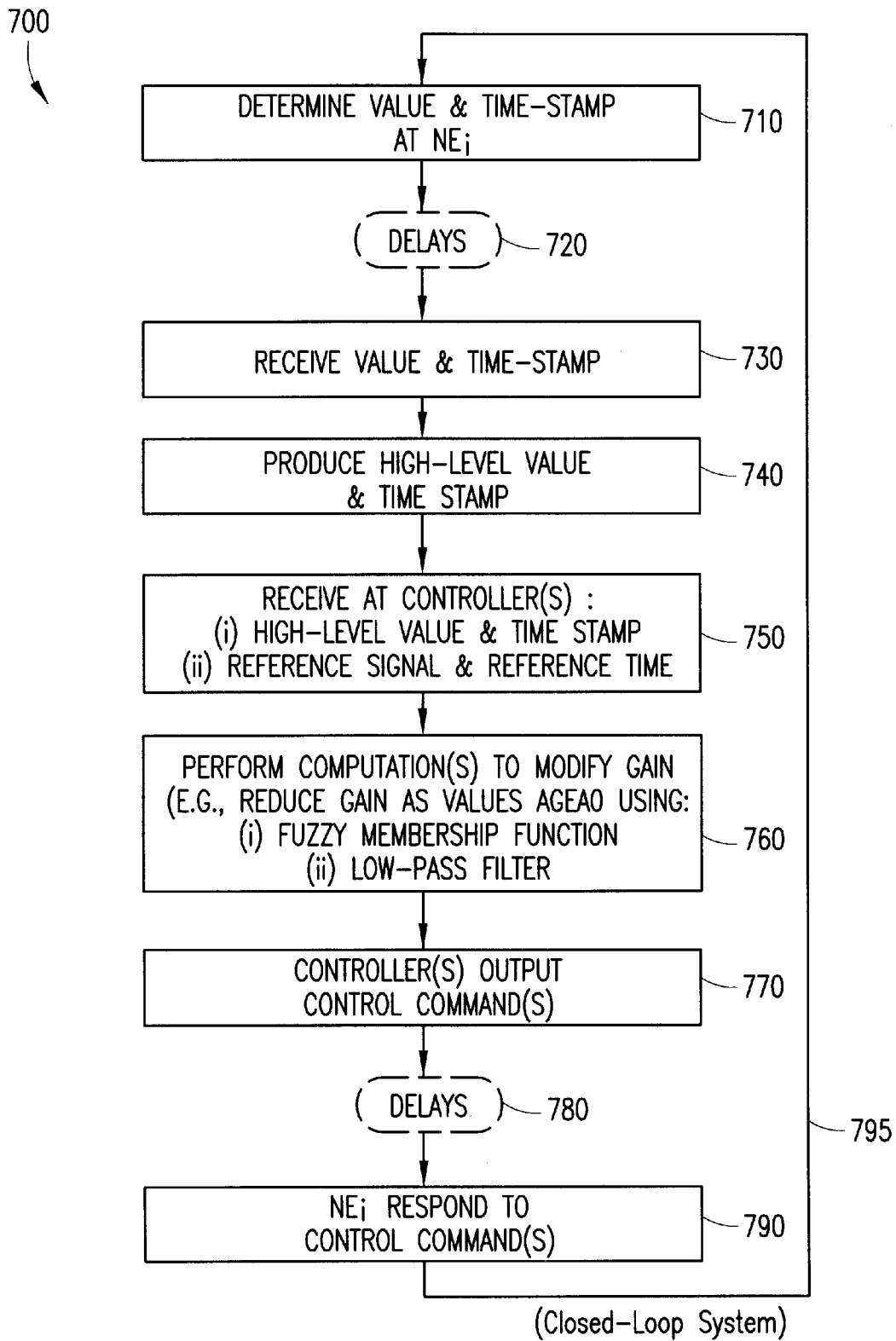
FIG. 7 illustrates an exemplary method in flowchart form for adaptive control of a system with measurements of varying age in accordance with the present invention.

Referring now to FIG. 7, an exemplary method in flowchart form for adaptive control of a system with measurements of varying age in accordance with the present invention is illustrated generally at 700. Each $NE_i$ (or other general element in a controlled system) that is a part of the system to be controlled determines a value and a time-stamp pertaining thereto (block 710). The value may be, for example, an NETL, and the value may be determined, for example, by measurement. After delays of (possibly) varying length affect the transmission duration of the determined value and time-stamp (broken-line oval 720), the determined value and time-stamp are received (block 730) (e.g., at a localized or distributed PMS). A "high-level" value and time-stamp are produced (block 740) (e.g., at the localized or distributed PMS).

The "high-level" value and time-stamp are passed to, and received at, a control system (e.g., one or more controllers) (block 750). The control system also receives a reference signal and reference time (also block 750). It should be noted that the system and method of the present invention may involve more than one reference signal and/or more than one reference time. The control system performs computational operation(s) to modify the gain of the overall control system (block 760). For example, when the "high-level" time-stamp indicates that the "high-level" value is "stale", the gain is reduced. The gain is not reduced, on the other hand, if the "high-level" time-stamp indicates that the "high-level" value is "fresh". This may be accomplished, for example, using a fuzzy membership function along with an (optional) LP filter (also block 760).

The control system uses the modified gain to produce a control command(s), which is then output (block 770). The control command(s) output by the control system experience delays, such as from transmission, queuing of the control command(s) at the $NE_i$s, handling/processing of the control commands at the $NE_i$s, etc. (broken-line oval 780). Each $NE_i$ (or other general element in a controlled system) that is a part of the system to be controlled responds appropriately to the control command(s) (block 790). For example, $NE_x$ may order some connections to handoff to $NE_y$ in response to the control command(s). The arrow 795 indicates that the method and system of the present invention preferably entails closed-loop computations.

Although preferred embodiment(s) of the method and system of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A telecommunications system having a set of elements that may be adaptively controlled using values of varying time delays, comprising:

a plurality of elements, each of said plurality of elements configured for determining at least one first value and at least one first associated time indication;

a monitoring mechanism, said monitoring mechanism for receiving said at least one first value and said at least one first associated time indication from said each of said plurality of elements, said monitoring mechanism producing a second value and a second associated time indication;

at least one controller in communication with said monitoring mechanism, said at least one controller receiving said second associated time indication and a reference time, whereby said at least one controller adjusts a gain of the telecommunications system responsive to a difference between said reference time and said second associated time indication.

2. The telecommunications system according to claim 1, wherein said plurality of elements comprise network elements.

3. The telecommunications system according to claim 1, wherein the telecommunications system comprises a wireless network system.

4. The telecommunications system according to claim 1, wherein said at least one first value comprises a traffic level associated with a cell of a wireless network system.

5. The telecommunications system according to claim 1, wherein said each of said plurality of elements are further configured for recording said at least one first associated time indication when said at least one first value is determined and for transmitting said at least one first value and said at least one first associated time indication to said monitoring mechanism.

6. The telecommunications system according to claim 1, wherein said plurality of elements are substantially interconnected.

7. The telecommunications system according to claim 1, wherein said at least one first associated time indication comprises a plurality of first associated time indications and said second associated time indication is determined responsive to a minimum of said plurality of first associated time indications.

8. The telecommunications system according to claim 1, wherein said monitoring mechanism is distributed over at least part of the telecommunications system.

9. The telecommunications system according to claim 1, wherein said monitoring mechanism and said at least one controller are comprised, at least partly, of software.

10. The telecommunications system according to claim 1, wherein said difference is applied to a function, said function being designed such that a first difference results in a greater reduction of said gain than a second difference when said first difference is greater than said second difference.

11. The telecommunications system according to claim 10, wherein said function comprises at least one fuzzy membership function.

12. The telecommunications system according to claim 1, wherein said controller comprises a filter, and said controller adjusts said gain of the telecommunications system further responsive to an output of said filter.

13. The telecommunications system according to claim 1, wherein:

said at least one controller comprises a summer, a function result determiner, and a filter;

said summer produces said difference, said difference is applied to said function result determiner, and a result of said function result determiner is applied to said filter; and an output of said filter comprises a weighting factor for said gain.

14. The telecommunications system according to claim 1, wherein said at least one controller receives said second value and a reference value, whereby said at least one controller produces at least one control command responsive to said gain, said second value, and said reference value.

15. The telecommunications system according to claim 14, wherein said at least one controller is configured to transmit said at least one control command to at least one of said plurality of elements, said at least one of said plurality of elements responding to said at least one control command.

16. A method in a telecommunications system for adapting a control process that operates with time-delayed values, the control process including a gain, comprising the steps of:

receiving at least one determined value and a time associated with said at least one determined value;

determining whether said time associated with said at least one determined value renders said at least one determined value stale based, at least in part, on a reference time and using, at least partly, a functional relationship; and if so, reducing the gain of the control process.

17. The method according to claim 16, further comprising the steps of:

receiving a reference value; and determining a control command based, at least in part, on said at least one determined value, said reference value, and the gain.

18. The method according to claim 17, further comprising the step of:

transmitting said control command to at least one network element; and altering, by said at least one network element, a traffic load of said at least one network element in response to said control command.

19. The method according to claim 16, further comprising the steps of:

determining, by at least one network element, said at least one determined value by measuring said at least one determined value;

recording, at said at least one network element, a time of measuring of said at least one determined value as said time associated with said at least one determined value; and sending, by said at least one network element, said at least one determined value and said time associated with said at least one determined value to a wireless network operation system of the telecommunications system.

20. The method according to claim 16, wherein said step of determining whether said time associated with said at least one determined value renders said at least one determined value stale based, at least in part, on a reference time and using, at least partly, a functional relationship further comprises the step of determining whether said time associated with said at least one determined value renders said at least one determined value stale using a low pass filter to retard the rate of change of the gain.

21. The method according to claim 16, wherein said functional relationship comprises a fuzzy membership function.

22. A method for adaptively controlling a telecommunications network system having a plurality of network elements, comprising the steps of:

determining, by at least one of said plurality of network elements, a first value and a first associated time indicator;

determining a second associated time indicator based, at least in part, on said first associated time indicator;

ascertaining a reference time; and determining a gain based, at least in part, on said second associated time indicator and said reference time.

23. The method according to claim 22, further comprising the steps of:

determining a second value based, at least in part, on said first value;

ascertaining a reference signal; and determining a control command based, at least in part, on said second value, said reference signal, and said gain.

24. The method according to claim 23, further comprising the step of responding, by at least one of said plurality of network elements, to said control command.

25. The method according to claim 22, wherein said telecommunications network system comprises a wireless network system.

26. The method according to claim 22, wherein said telecommunications network system operates based, at least in part, on an Internet protocol.

27. The method according to claim 22, wherein said first value comprises a traffic load of said at least one of said plurality of network elements.

28. The method according to claim 22, wherein said step of determining a gain based, at least in part, on said second associated time indicator and said reference time further comprises the step of determining a difference between said second associated time indicator and said reference time.

29. The method according to claim 28, wherein said step of determining a gain based, at least in part, on said second associated time indicator and said reference time further comprises the step of applying said difference to a functional relationship.

30. The method according to claim 29, wherein said step of determining a gain based, at least in part, on said second associated time indicator and said reference time further comprises the step of passing to a low pass filter a result of said step of applying said difference to a functional relationship.

31. The method according to claim 29, wherein a result of said step of applying said difference to a functional relationship approaches zero as said difference increases.

32. The method according to claim 29, wherein said functional relationship comprises a fuzzy membership function.

33. The method according to claim 29, wherein said step of determining a gain based, at least in part, on said second associated time indicator and said reference time further comprises the step of applying said difference to a functional relationship such that said gain decreases when said difference increases.

* * * * *